United States Patent [19]

Iwama et al.

[11] 3,785,828

[45] Jan. 15, 1974

[54] LIGHT-SENSITIVE SILVER HALIDE COLOR PHOTOGRAPHIC MATERIAL

[75] Inventors: Masakuni Iwama; Toshihiko Yamamoto; Isaburo Inoue; Teruo Hanzawa; Takaya Endo, all of Tokyo, Japan

[73] Assignee: Konishiroku Photo Industry Co., Ltd., Tokyo, Japan

[22] Filed: Sept. 6, 1972

[21] Appl. No.: 286,718

Related U.S. Application Data

[63] Continuation-in-part of Ser. No. 66,140, Aug. 21, 1970, abandoned.

[30] Foreign Application Priority Data

Aug. 28, 1969 Japan.............................. 44-67622

[52] U.S. Cl. ................................................ 96/100
[51] Int. Cl............................................. G03c 1/40
[58] Field of Search ...................................... 96/100

[56] References Cited
UNITED STATES PATENTS 3,658,537  4/1972  Credner et al...................... 96/100
3,676,142  7/1972  Carpentier et al................... 96/100
3,700,454  10/1972  Sakamoto et al..................... 96/100
3,737,318  6/1973  Inoue et al......................... 96/100

Primary Examiner—J. Travis Brown
Attorney—Eric H. Waters et al.

[57] ABSTRACT

Light sensitive silver halide color photographic materials containing novel coupler having the general formula:

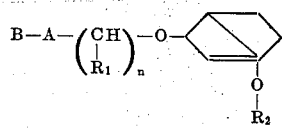

wherein B is a coupler residue; $R_1$ is hydrogen or a lower alkyl group; $R_2$ is an aliphatic hydrocarbon group having eight to 18 carbon atoms; $n$ is an integer of one to four; and A is an -NHCO- or -CONH- group, provided that in case A is a -CONH- group, $R_1$ is hydrogen and $n$ three or four.

2 Claims, No Drawings

LIGHT-SENSITIVE SILVER HALIDE COLOR PHOTOGRAPHIC MATERIAL

CROSS REFERENCE TO RELATED APPLICATION

This application is a continuation-in-part application of Ser. No. 66,140 filed Aug. 21, 1970, now abandoned.

The present invention relates to light-sensitive color photographic materials containing novel couplers for forming yellow, red and blue colored images as represented by the general formula shown below which belong to the so-called protect type couplers used in such a manner that water-insoluble or difficultly water-soluble couplers are dissolved in difficultly water-miscible high boiling solvents and the resulting solutions are dispersed in photographic emulsions.

General Formula:

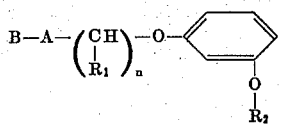

wherein B is a coupler residue; $R_1$ is hydrogen or a lower alkyl group; $R_2$ is an aliphatic hydrocarbon group having eight to 18 carbon atoms; $n$ is an integer of one to four; and A is an -NHCO- or -CONH- group, provided that in case A is a -CONH- group, $R_1$ is hydrogen and $n$ three or four.

Heretofore, many compounds have been proposed as protect type couplers. However, they have various drawbacks, and couplers available at lower costs and with higher purity have scarcely been known.

For example, the coupler disclosed in U. S. Pat. No. 2,801,171,

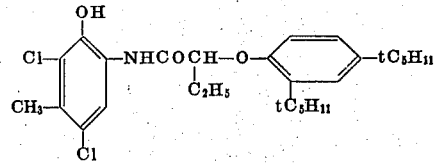

and the coupler disclosed in U. S. Pat. No. 3,062,653,

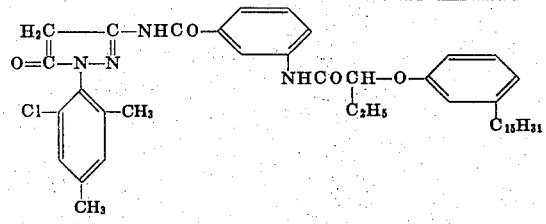

have excellent solubility in high boiling solvents, but they are prepared from expensive starting materials and can be purified only with difficulty.

In contrast thereto, the couplers represented by the aforesaid general formula which are used in the present invention have many such favorable characteristics that they can be prepared simply and economically using as starting materials resorcinol and alkyl bromides which are obtainable easily and at low costs from the domestic market; that they are easily soluble in such high boiling solvents as dibutyl phthalate, tricresyl phosphate and the like, so that the amounts of the solvents can be decreased and dispersions high in concentration of the couplers can be obtained; and that the synthesized couplers are low in melting point and hence crystallize with difficulty not only in photographic emulsions but also in films formed by coating and drying the emulsions. Thus, the couplers used in the present invention are extremely useful as protect type couplers, and have greatly overcome the drawbacks of the conventional couplers. Accordingly, the light-sensitive color photographic materials incorporated with the said couplers are excellent in spectral absorption and durability and can give high density color images which are excellent in transparency.

The couplers used in the present invention are synthesized, for example, in the following manner:

A long chain alkyl bromide and resorcinol are condensed each other in dimethylformamide in the presence of potassium bicarbonate to form a resorcinol monoalkyl ether, which is then condensed with a halogeno-fatty acid to obtain a long chain alkyloxyphenoxy fatty acid. Subsequently, the acid is treated with phosphorus pentachloride to form an acid chloride, which is then condensed with a coupler component having an amino group to synthesize the coupler of the present invention. Alternatively, the resorcinol monoalkyl ether is cyanoalkylated and then subjected to catalytic reduction to form a long chain alkyloxyphenoxyalkylamine, which is then condensed with a coupler component having an acid halide or acid ester group to synthesize the coupler of the present invention.

The coupler residue in the aforesaid general formula shows a residue of the compound $B-NH_2$ or $B-COOH$, which can form a dye by coupling with an oxidation product of a $p$-phenylenediamine type color-developer, and is a residue of a compound having a phenolic hydroxy group, such as phenol or naphthol, or of a compound having an active methylene group, such as pyrazolone or acylacetanilide.

Typical examples of the couplers represented by the aforesaid general formula are shown below, but couplers usable in the present invention are, of course, not limited thereto.

(1) 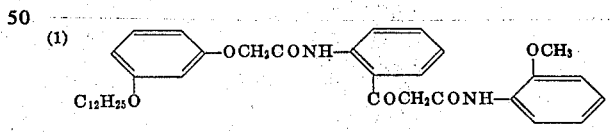

α-{3- [α-(3-Dodecyloxyphenoxy) acetamide] benzoyl} -2-methoxyacetanilide (2) 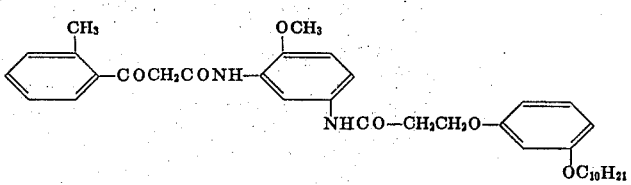

α-(2-Methylbenzoyl)-2-methoxy-5-decyloxyphenoxy) propionamide] acetanilide (3)
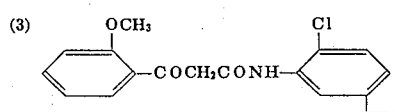

α-(2-Methoxybenzoyl)-2-chloro-5-octylphenoxy) butylamide] acetanilide (4)
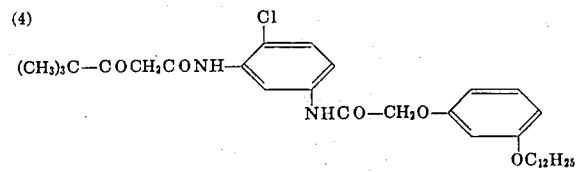

α-Pivalyl-2-chloro-5-(3-dodecyloxyphenoxy-acetamide) acetanilide (5)
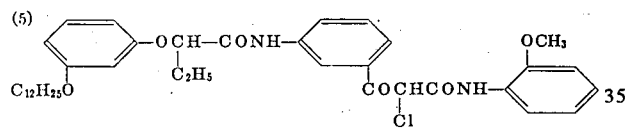

α-Chloro-α-[3-(α-3-dodecyloxyphenoxy) butylamide] benzoyl-2-methoxyacetanilide (6)
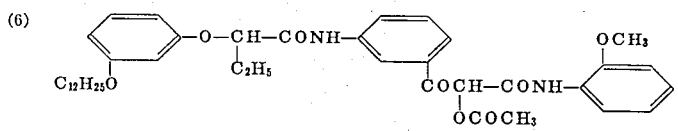

α-Acetoxy-α-[3-(α-3-dodecyloxyphenoxy) butylamide] benzoyl-2-methoxyacetanilide (7)
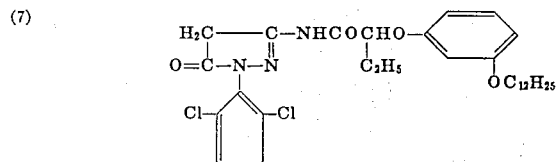

1-(2,4,6,-Trichlorophenyl)-3-(α-3-dodecyloxyphenoxybutylamide)-5-pyrazolone (8)
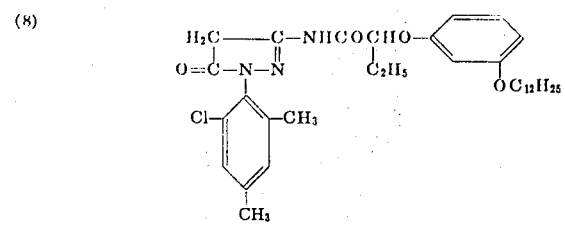

[β-(3- 1-(2,4-Dimethyl-6-chlorophenyl)-3-(α-3-dodecyloxyphenoxybutylamide)-5-pyrazolone (9)
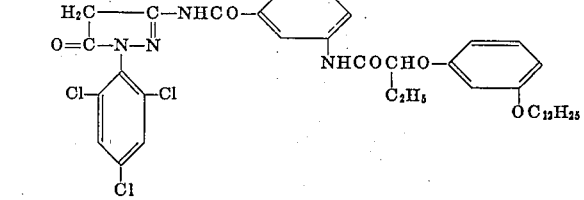

[γ-(3- 1-(2,4,6-Trichlorophenyl)-3-[3-(α-3-dodecylphenoxybutylamide) benzamide]-5-pyrazolone

(10)
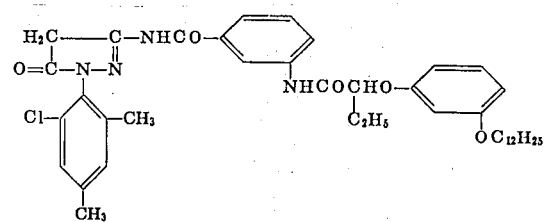

1-(2,4-Dimethyl-6-chlorophenyl)-3-[3-(α-3-dodecyloxyphenoxybutylamide) benzamide]-5-pyrazolone

(11)
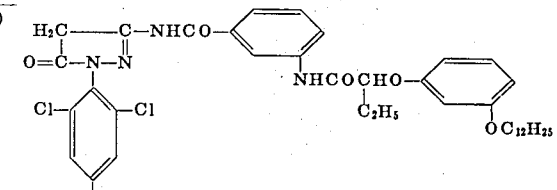

1-(2,6-Dichloro-4-methoxyphenyl)-3-[3-(α-3-dodecyloxyphenoxybutylamide) benzamide]-5-pyrazolone

(12)
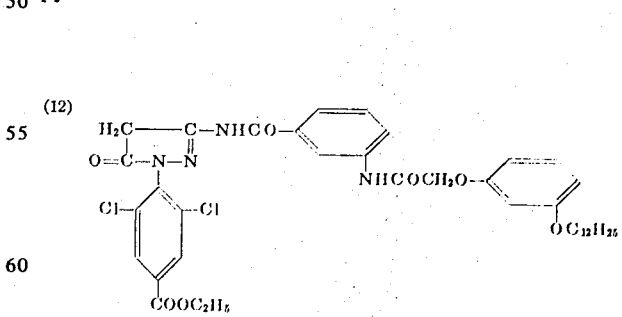

1-(2,6-Dichloro-4-ethoxycarbonylphenyl)-3-[(3-dodecyloxyphenoxy-acetamide) benzamide]-5-pyrazolone

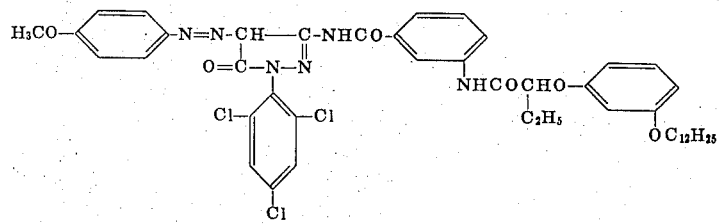

1-(2,4,6-Trichlorophenyl)-3-[3-(α-3-dodecyloxy-phenoxybutyrylamide) benzamide]-4-(4-methoxy-phenylazo)-5-pyrazolone

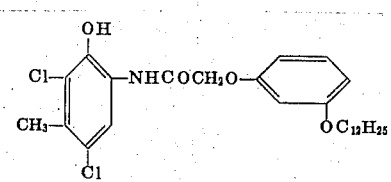

2,4-Dichloro-6-(3-dodecyloxyphenoxy-acetamide)-3-methylphenol

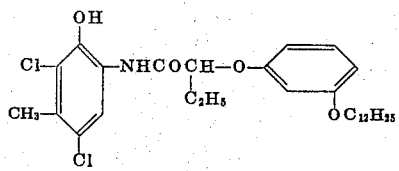

2,4-Dichloro-6-(α-3-dodecyloxyphenoxy-butylamide)-3-methylphenol

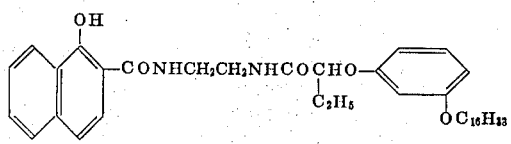

N-[2-(α-3-Hexadecyloxyphenoxy-butylamide)-ethyl]-1-hydroxy-2-naphthamide

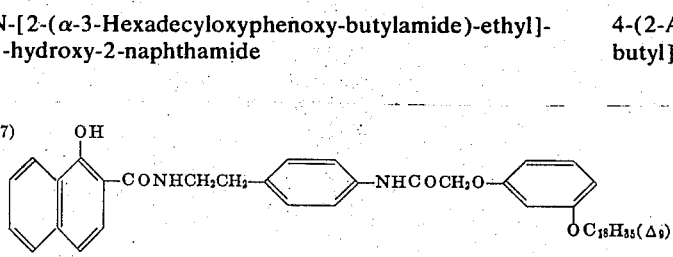

N-{2-[4-(3-Octadecenyloxyphenoxy-acetamide) phenyl]ethyl}-1-hydroxy-2-naphthamide

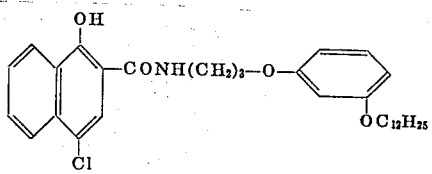

4-Chloro-N-[α-(3-dodecyloxyphenoxy) propyl]-1-hydroxy-2-naphthamide

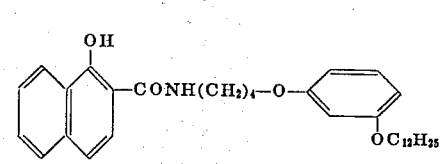

N-[δ-(3-Dodecyloxy) butyl]-1-hydroxy-2-naphthamide

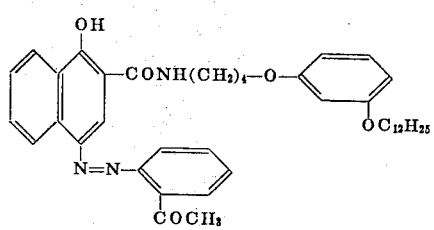

4-(2-Acetylphenylazo)-N-[δ-(3-dodecyloxyphenoxy) butyl]-1-hydroxy-2-naphthamide

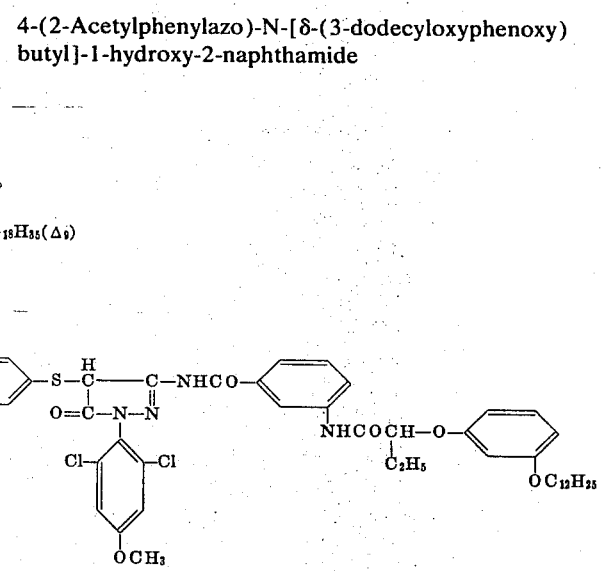

1-(2,6-Dichloro-4-methoxyphenyl)-3-[3-(α-3-dodecyloxyphenoxybutylamide) benzamide]-4-phenylthio-5-pyrazolone (22)

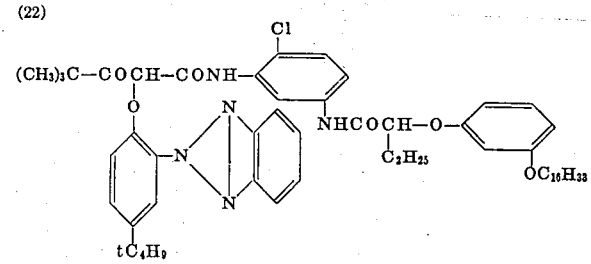

α-Pyvalyl-α-[2-(benzotriazole-2)-4-t-butylphenoxy]-2-chloro-5-(α-3-hexadecyloxyphenoxy-butylamide) acetanilide (23)

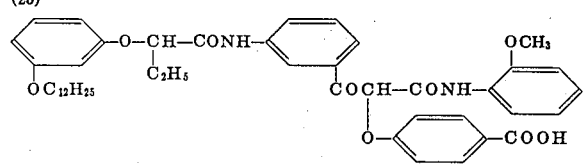

α-{3-[α-(3-Dodecyloxyphenoxy) butylamide] benzoyl}-α-(4-carboxyphenoxy)-2-methoxyacetanilide The preparation of typical couplers among those represented by the aforesaid general formula is shown below with reference to synthesis examples.

Synthesis Example 1 a. A solution of 13.8 g. of metallic sodium in 300 ml. of alcohol was boiled for 30 minutes in the presence of 86.5 g. (0.3 mole) resorcinol monodecyl ether. Thereafter, the solution was charged with 50.5 g. (0.3 mole) of α-bromobutyric acid and then boiled with stirring for 3 hours. The reaction mixture was then poured into ice water and acidified with HCl. Subsequently, a precipitate deposited was recovered by filtration, dried and then recrystallized from a mixed solution comprising methanol and water to obtain α-(3-decyloxyphenoxy) butyric acid, m.p. 84°–85° C., yield 72%.

In the same manner as above, there were obtained the long chain alkyloxyphenoxy fatty acids which were used in the synthesis examples set forth later. For example, 3-dodecyloxyphenoxy-acetic acid, m.p. 178°–180° C., was obtained from resorcinol monodecyl ether and monochloroacetic acid; β-(3-decyloxyphenoxy) propionic acid, m.p. 100°–101° C., from resorcinol monododecyl ether and β-bromopropionic acid; γ-(3-octyloxyphenoxy) butyric acid, m.p. 85°–86° C., from resorcinol monooctyl ether and γ-bromobutyric acid; α-(3-hexadecyloxyphenoxy) butyric acid, m.p. 92°–93° C., from resorcinol monohexadecyl ether and α-bromobutyric acid; and 3-octadecenyloxyphenoxy-acetic acid, m.p. 120°–125° C., from resorcinol monooctadecenyl ether and monochloroacetic acid. The resorcinol monoalkyl ethers used herein were prepared according to the method disclosed in U. S. Pat. No. 2,166,181.

b. The thus obtained long chain alkyloxyphenoxy-fatty acid was treated with phosphorus pentachloride to form a corresponding acid chloride. For example, 36.4 g. of 3-dodecyloxyphenoxy-acetic acid was suspended in 100 ml. of chloroform. The resulting suspension was charged with phosphorus pentachloride, allowed to stand for 30 minutes and then heated for 30 minutes in a water bath kept at 60° C. Thereafter, formed phosphorus oxychloride and chloroform were removed by distillation under reduced pressure, and the residual chloride was used in the subsequent acylation step.

c. 28.4 g. (0.1 mole) of α-(3-aminobenzoyl)-2-methoxyacetanilide was suspended in a mixture comprising 140 ml. of acetonitrile and 4 ml. of pyridine. To the resulting suspension was added the chloride obtained in the step (b), and the mixture was boiled for 1 hour and then charged into 700 ml. of water to deposit a resionous precipitate. The mother liquor was removed by decantation and kneaded with hexane to form a solid.

The solid precipitate was recovered by filtration and then recrystallized from a mixed solvent comprising ligroin and ethyl acetate to obtain the exemplified coupler (1), yield 72 percent.

In the same manner as above, the exemplified couplers (2), (3), (4), (7), (8), (9), (10), (11), (12), (16) and (17) could be synthesized by the condensation of color-forming compound having amino groups with acid chlorides having different alkyl chains.

| Exemplified coupler | Melting point (°C) | Nitrogen analysis (%) | |
|---|---|---|---|
| | | Calculated | Found |
| (1) | 48–50 | 4.45 | 4.48 |
| (2) | 91–92 | 4.65 | 4.50 |
| (3) | 83–84 | 4.59 | 4.43 |
| (4) | 75–76 | 4.77 | 4.63 |
| (7) | 103–105 | 6.72 | 6.56 |
| (8) | 80–82 | 7.19 | 7.04 |
| (9) | 95–97 | 7.52 | 7.34 |
| (10) | 78–80 | 7.96 | 7.81 |
| (11) | 90–91 | 7.57 | 7.60 |
| (12) | 125–127 | 7.43 | 7.15 |
| (16) | 135–137 | 4.43 | 4.22 |
| (17) | 123–124 | 3.96 | 3.83 |

Synthesis Example 2

22.9 g. of 2-amino-4,6-dichloro-5-methylphenol hydrochloride was mixed with 550 ml. of acetone and 25.0 g. of diethylaniline. The resulting mixture was incorporated with 40.0 g. of the chloride obtained in the step (b) of Synthesis Example 1, stirred for 1 hour, boiled for 1 hour and then filtered. The filtrate was concentrated and then charged into a mixed solution comprising concentrated hydrochloric acid and water to form a solid. Subsequently, the solid was recovered by filtration, water-washed, dried and then recrystallized from hexane to obtain 35.0 g. of a white powder, m.p. 63–64, yield 63 percent. The thus obtained powder was the exemplified coupler (15).

In the same manner as above, the exemplified coupler (14) was obtained by use of dodecyloxyphenoxyacetyl chloride.

| Exemplified coupler | Melting point (°C) | Nitrogen analysis (%) | |
|---|---|---|---|
| | | Calculated | Found |
| (14) | 122–123 | 2.74 | 3.08 |
| (15) | 63–64 | 2.53 | 2.66 |

Synthesis Example 3

The exemplified coupler (1) was reacted with sulfuryl chloride in chloroform to obtain the exemplified coupler (5), which was then reacted with anhydrous sodium acetate in glacial acetic acid to obtain the exemplified coupler (6).

| Exemplified coupler | Melting point (°C) | Nitrogen analysis (%) | |
|---|---|---|---|
| | | Calculated | Found |
| (5) | 42–45 | 4.22 | 4.07 |
| (6) | 94–96 | 4.13 | 4.18 |

Synthesis Example 4 a. Resorcinol monododecyl ether and γ-chlorobutyronitrile were condensed each other in the presence of an alkali, and then subjected to catalytic reduction at 50° C. under 20 atm., using a Raney nickel, to obtain δ-(3-dodecyloxyphenoxy) butylamine, m.p. 50°–50.5° C.

In the same manner as above, resorcinol momododecyl ether and acrylonitrile were condensed each other to synthesize β-(3-dodecyloxyphenoxy) propionitrile, which was then subjected to reduction to obtain γ-(3-dodecyloxyphenoxy) propylamine, m.p. 55°–56° C.

b. 5.3 g. of phenyl 1-hydroxynaphthoate and the aforesaid δ-(3-dodecyloxyphenoxy) butylamine were heated and melted at 130° to 140° C., and the formed phenol was removed by means of a vacuum pump. Subsequently, the residue was cooled and then recrystallized from n-hexane to obtain the exemplified coupler (19). In the same manner as above, the exemplified coupler (18) was also synthesized.

| Exemplified coupler | Melting point (°C) | Nitrogen analysis (%) | |
|---|---|---|---|
| | | Calculated | Found |
| (18) | 76–77 | 2.48 | 2.35 |
| (19) | 67–68 | 2.58 | 2.42 |

Synthesis Example 5

3.6 g. of p-anisidine was diazotized with a mixture comprising 40.0 ml. of water, 10.0 ml. of concentrated hydrochloric acid and 2.4 g. of sodium nitrite, and then charged with 80 ml. of alcohol to form a diazonium salt solution. This solution was added to a solution of 14.9 g. of the exemplified coupler (9) in 149 ml. of pyridine. After stirring for 3 hours, the mixed solution was diluted with 300 ml. of water and then charged with 128 ml. of concentrated hydrochloric acid. Subsequently, a deposited precipitate was recovered by filtration, water-washed, dried and then recrystallized from ligroin to obtain an orange powder having a melting point of 85°–86° C. This powder was the exemplified coupler (13).

In the same manner as above, o-aminoacetophenone was diazotized and then subjected to coupling reaction with the exemplified coupler (19) to obtain the exemplified coupler (20).

| Exemplified coupler | Melting point (°C) | Nitrogen analysis (%) | |
|---|---|---|---|
| | | Calculated | Found |
| (13) | 85–86 | 9.56 | 9.42 |
| (20) | 111–113 | 2.70 | 2.57 |

In the next place, test results showing the facts that the couplers used in the present invention are low in melting point and excellent in solubility in high boiling solvents are set forth in Tables 1 and 2.

TABLE I.—COMPARISON IN MELTING POINT BETWEEN THE COUPLERS USED IN THE PRESENT INVENTION AND KNOWN COUPLERS SIMILAR IN STRUCTURE THERETO

| Coupler | Structure | Melting point, °C |
|---|---|---|
| Exemplified coupler (14). | OH, Cl, CH₃, Cl — NHCOCH₂O — OC₁₂H₂₅ | 122–123 |
| Known coupler | OH, Cl, CH₃, Cl — NHCOCH₂O — tC₅H₁₁, tC₅H₁₁ | 158–160 |
| Exemplified coupler (15). | OH, Cl, CH₃, Cl — NHCOCH(C₂H₅)—O— OC₁₂H₂₅ | 63–64 |
| Coupler disclosed in United States Patent 2,801,171. | OH, Cl, CH₃, Cl — NHCOCH(C₂H₅)—O— tC₅H₁₁, tC₅H₁₁ | 123–124 |

TABLE 1.—COMPARISON IN MELTING POINT BETWEEN THE COUPLERS USED IN THE PRESENT INVENTION AND KNOWN COUPLERS SIMILAR IN STRUCTURE THERETO — Continued

| Coupler | Structure | Melting point, °C. |
|---|---|---|
| Exemplified coupler (9) | [structure with 2,4,6-trichlorophenyl pyrazolone, NHCO-phenyl-NHCOCHO($C_2H_5$)-phenyl-$OC_{12}H_{25}$] | 95–97 |
| Coupler disclosed in United States Patent 2,618,641. | [structure with 2,4,6-trichlorophenyl pyrazolone, NHCO-phenyl-NHCOCH$_2$O-phenyl-di-$tC_5H_{11}$] | 138–139 |

TABLE 2.—COMPARISON IN SOLUBILITY

| Coupler | Structure | Amount of dibutyl phthalate (ml.) |
|---|---|---|
| Exemplified coupler (1) | $C_{12}H_{25}O$-phenyl-OCH($C_2H_5$)ONH-phenyl-COCH$_2$CONH-phenyl-$OCH_3$ | 2.0 |
| Coupler disclosed in United States Patent 2,875,057. | di-$tC_5H_{11}$-phenyl-OCH($C_2H_5$)-CONH-phenyl-COCH$_2$CONH-phenyl-$OCH_3$ | 7.5 |
| Exemplified coupler (9) | [structure with 2,4,6-trichlorophenyl pyrazolone, NHCO-phenyl-NH-COCHO($C_2H_5$)-phenyl-$OC_{12}H_{25}$] | 2.0 |
| Coupler disclosed in United States Patent 2,618,641. | [structure with 2,4,6-trichlorophenyl pyrazolone, NHCO-phenyl-NHCOCH$_2$O-phenyl-di-$tC_5H_{11}$] | 11.0 |
| Exemplified coupler (15). | [structure: 2-OH, 3-Cl, 5-CH$_3$, 6-Cl phenyl with NHCOCHO($C_2H_5$)-phenyl-$OC_{12}H_{25}$] | 1.5 |
| Coupler disclosed in United States Patent 2,801,171. | [structure: 2-OH, 3-Cl, 5-CH$_3$, 6-Cl phenyl with NHCOCHO($C_2H_5$)-phenyl-di-$tC_5H_{11}$] | 3.0 |

In Table 2, the solubility of each coupler for high boiling solvent was represented by the amount of dibutyl phthalate necessary for dissolving 1 g. of the coupler at 60° C.

As is clear from Tables 1 and 2, it is understood that the couplers used in the present invention are lower in melting point and more excellent in solubility in high boiling solvents than the known couplers, and hence are markedly useful as protect type couplers.

The couplers used in the present invention can be incorporated into light-sensitive photographic materials according to any of the known processes. For example, the couplers are dissolved, either singly or in combination of 2 or more, in a high boiling solvent having a boiling point of more than 175° C. such as tricresyl phosphate or dibutyl phthalate, or a low boiling solvent such as butyl acetate or butyl propionate, or if necessary a mixture thereof, and the resulting solution is mixed with an aqueous gelatine solution containing a surface active agent. Subsequently, the mixed solution is emulsified by means of a high speed rotary mixer or colloid mill, and then the resulting emulsified liquid is added directly to a silver halide photographic emulsion, which is then coated on a support such as glass plate, synthetic resin plate, film base, baryta paper or laminate paper, followed by drying to remove a major proportion of the low boiling solvent, whereby the color photographic material of the present invention can be obtained. Alternatively, there may be adopted such a process that the above-mentioned emulsified liquid is once set, finely cut and then subjected to water-washing or the like treatment to remove the low boiling solvent, and the residue is added to a photographic emulsion, which is then coated on a support, followed by drying.

The above-mentioned processes are illustrative and are not limitative.

The amount of the coupler to be added to the photographic emulsion is preferably in the range of 10 to 100 g. per mole of the silver halide, but the amount is not always limited to said range and is variable according to the purpose of application and the like. Further, the couplers may be incorporated into two or more of different emulsion layers of a multi-layered light-sensitive color photographic material.

The photographic emulsions used in the present invention may contain any of such silver halides as silver chloride, silver idodobromide, silver chlorobromide, etc., and may have been incorporated with chemical sensitizers, e.g., sulfur sensitizers, natural sensitizers present in gelatine, reduction sensitizers and noble metal salts. The emulsions may further contain ordinary photographic additives, e.g., anti-foggants, stabilizers, anti-stain agents, anti-irradiation agents, physical property-improving high molecular additives, hardeners, coating aids, etc. Further, the emulsions may have been incorporated with known carbocyanine dyes or merocyanine dyes as optical sensitizers.

The thus obtained light-sensitive color photographic materials are exposed to $\alpha$-ray, $\beta$-ray, visible ray or infrared ray, developed with a developer containing a p-phenylenediamine type developer as main ingredient, and then bleached, de-silvered and fixed, whereby color images which are excellent not only in spectral absorption and durability but also in transparency and in density can be obtained. The light-sensitive color photographic materials can be further improved in durability of color images by incorporating a UV-absorber of the benzophenone or triazole type (for example, 2-hydroxy-4-dodecyloxy-benzophenone or 2-(2'-hydroxy-3',5'-di-tert.butyl-phenyl)-benzotriazole respectively) into said color photographic material.

Typical examples of the developing agent used for the development of the present color photographic materials are sulfates, sulfites and hydrochlorides of N,N-diethyl-p-phenylenediamine, N-ethyl-N-$\beta$-methanesulfonamidoethyl-3-methyl-4-aminoaniline, N-ethyl-N-hydroxyethyl-p-phenylene-diamine, N-ethyl-N-hydroxyethyl-2-methyl-p-phenylenediamine and N,N-diethyl-2-methyl-p-phenylenediamine.

Further, the color developer may contain, in addition to the aforesaid agents, such a development modifier as citrazinic acid or the like.

The present invention is illustrated in further detail below with reference to examples, but the examples are merely illustrative and it is needless to say that the invention is not limited thereto.

Example 1

20.0 g. of the exemplified coupler (1) was added to a mixed solution comprising 20 ml. of dibutyl phthalate and 60 ml. of butyl acetate, and then heated to 60° C. whereby the coupler dissolved completely. This solution was mixed with 10 ml. of a 10 percent aqueous solution of Alkanol B (alkylnaphthalene sulfonate produced by Du Pont) and 200 ml. of a 5 percent aqueous gelatin solution, and then subjected to a colloid mill to form a dispersion. The thus formed coupler dispersion was added to 1 kg. of a high speed gelatin silver iodobromide emulsion, which was then coated on a film base, followed by drying, to obtain a light-sensitive photographic material having a stable film.

This light-sensitive material was exposed according to an ordinary procedure and then developed at 20° C. for 10 minutes with a developer of the following composition:

N-Ethyl-N-$\beta$-methanesulfonamidoethyl-3-methyl-4-aminoaniline sulfate—5.0 g.
Anhydrous sodium sulfite—2.0 g.
Benzyl alcohol—3.8 g.
Sodium carbonate (monohydrate)—50.0 g.
Potassium bromide—1.0 g.
Caustic soda—0.55 g.
Water to make—1,000 ml.

Subsequently, the light-sensitive material was subjected to ordinary stopping and fixing, washed with water for 10 to 15 minutes, and then treated for 5 minutes with a bleaching solution of the following composition:

Potassium ferricyanide—100 g.
Potassium bromide—50 g.
Water to make—1,000 ml.

After water-washing for additional 5 minutes, the light-sensitive material was fixed for 5 minutes in a fixing bath of the following composition:

Sodium thiosulfate—250 g.
Water to make—1,000 ml.

The thus treated light-sensitive material was washed with water for 20 to 25 minutes and then dried to obtain a brilliant yellow colored image having an absorption maximum at 440 m$\mu$.

Further, the exemplified couplers (9) and (19) were treated in the same manner as above to prepare light-sensitive materials. After exposure, these light-sensitive materials were subjected to the same color development as above to obtain magenta any cyan colored images having absorption maximums at 555 mμ and 695 mμ, respectively.

Example 2

10 g. of the exemplified coupler (2) was added to a mixed solution comprising 10 ml. of tricresyl phosphate and 30 ml. of butyl acetate, and then heated to 50° C. whereby the coupler dissolved completely. This solution was mixed with 5 ml. of a 10 percent aqueous solution of Alkanol B and 800 ml. of a 5 percent aqueous gelatin solution, and then subjected to colloid milling to form a dispersion. The thus formed dispersion was added to 500 g. of a gelatin silver iodobromide emulsion, which was then coated on a film base to obtain a photographic material having a stable film.

This photographic material was exposed and then developed at 21° C. for 12 minutes with a developer of the following composition:

Metol—3.0 g.
Anhydrous sodium sulfite—50.0 g.
Hydroquinone—6.0 g.
Anhydrous sodium carbonate—40.0 g.
Potassium bromide—3.5 g.
Potassium thiocyanide—2.0 g.
Water to make—1,000 ml.

After ordinary stopping, hardening and water-washing, the photographic material was subjected to second exposure by use of a white light and then developed at 21° C. for 13 minutes with a developer of the following composition:

N,N-Diethyl-2-methyl-p-phenylenediamine—3.0 g.
Anhydrous sodium sulfite—4.0 g.
Sodium carbonate (monohydrate)—20.0 g.
Potassium bromide—2.0 g.
Water to make—1,000 ml.

Subsequently, the photographic material was subjected to ordinary stopping, water-washing, bleaching and fixing, and then washed with running water for 20 minutes, followed by drying, to obtain a yellow positive color image excellent in transparency which had an absorption maximum at 445 mμ.

Further, the exemplified couplers (10) and (16) were treated in the same manner as above to prepare light-sensitive materials. After exposure, these light-sensitive materials were subjected to the same color development as above to obtain brillant magenta and cyan colored images having absorption maximums at 545 mμ and 710 mμ, respectively.

Example 3

10 g. of the exemplified coupler (15) was mixed with 20 ml. of dibutyl phthalate, and then heated to 50° C. whereby the coupler dissolved completely. This solution was mixed with 5 ml. of a 10 percent aqueous solution of Alkanol B and 200 ml. of a 5 percent aqueous gelatin solution, and then treated several times by means of a colloid mill to form a dispersion. The thus formed dispersion was added to 500 g. of a gelatin silver chlorobromide emulsion, which was then coated on a baryta paper, followed by drying, to prepare a light-sensitive material.

This light-sensitive material was exposed and then developed at 25° C. for 10 minutes with a developer of the following composition:

N-Ethyl-N-β-methanesulfonamidoethyl-3-methyl-4-aminoaniline sulfate—8.5 g.
Trisodium phosphate, 12H$_2$O—15.0 g.
Sodium metaborate—10.0 g.
Anhydrous sodium sulfite—7.0 g.
Hydroxylamine sulfate—2.0 g.
Potassium bromide—0.5 g.
6-Nitrobenzimidazole nitrate—0.04 g.
Benzyl alcohol—10 ml.
Diethylene glycol—20 ml.
Caustic soda—1.2 g.
Water to make—1,000 ml.

Subsequently, the light-sensitive material was immersed for 2 to 4 minutes in a stopping-fixing bath of the following composition:

Ammonium thiosulfate—120 g.
Potassium metabisulfite—20 g.
Glacial acetic acid—10 cc.
Water to make—1,000 ml.

Thereafter, the light-sensitive material was washed with water for 5 minutes and then bleached at 25° C. for 3 minutes in a bath of the following composition:

Sodium nitrate—28.0 g.
Potassium ferricyanide—10.0 g.
Boric acid—7.5 g.
Potassium bromide—7.5 g.
Water to make—1,000 ml.

After water-washing for 10 minutes, the light-sensitive material was immersed for 2 minutes in a stabilization bath and then dried to obtain a cyan colored image excellent in resistance to light and humidity which had an absorption maximum at 670 mμ.

Example 4

2.0 g. of the exemplified coupler (13) was added to a mixed solution comprising 2 ml. of dibutyl phthalate and 6 ml. of butyl acetate, and then heated to 60° C. whereby the coupler dissolved completely. This solution was mixed with 1 ml. of a 10 percent aqueous solution of Alkanol B and 20 ml. of a 5 percent aqueous gelatin solution, and then subjected to a colloid mill to form a dispersion. The thus formed coupler dispersion was added to 100 g. of a high speed silver iodobromide emulsion, which was then coated on a film base, followed by drying, to prepare a light-sensitive material.

This light-sensitive material was exposed according to an ordinary procedure and then subjected to the same color development as in Example 1 to obtain a yellow colored positive image having an absorption maximum at 440 mμ and a magenta colored image having an absorption maximum at 555 mμ.

The same procedures as above were repeated, except that the exemplified coupler (20) was used in place of the exemplified coupler (13), to obtain a red colored positive image having an absorption maximum at 500 mμ and a cyan colored image having an absorption maximum at 695 mμ.

Example 5

5.0 g. of the exemplified coupler (18) was added to 5.0 ml. of dibutyl phthalate and then heated to 60° C. whereby the coupler dissolved completely. This solution was mixed with 2.5 ml. of a 10 percent aqueous solution of Alkanol B and 50 ml. of a 5 percent aqueous gelatin solution, and then subjected to colloid mill to form a dispersion. The thus formed coupler dispersion was added to 500 g. of a red-sensitive silver chloride emulsion, which was then coated on a film base, followed by drying, to form a layer on the film base.

On the other hand, 5.0 g. of the exemplified coupler (1) was formed into a dispersion in the same manner as above, and the dispersion was added to 500 g. of a silver bromide emulsion. Subsequently, the emulsion was coated on the aforesaid layer containing the exemplified coupler (18) to prepare a light-sensitive material.

This light-sensitive material was exposed to X-rays according to an ordinary procedure, developed at 20° C. for 10 minutes with the same developer as in Example 1 and then subjected to ordinary stopping, hardening and water-washing treatments. Thereafter, the light-sensitive material was subjected to second exposure, developed at 20° C. for 10 minutes with the same developer as above, and then subjected to ordinary stopping, bleaching, fixing and water-washing treatments, followed by drying, to obtain a brilliant yellow colored image with a blue background.

Example 6

5.0 g. of the exemplified coupler (7) was added to a mixed solution comprising 5.0 g. of dibutyl phthalate and 1.5 ml. of butyl acetate, and then heated to 60° C. whereby the coupler dissolved completely. This solution was mixed with 2.5 ml. of a 10 percent aqueous solution of Alkanol B and 50 ml. of a 5 percent aqueous gelatin solution, and then subjected to a colloid mill to form a dispersion. The thus formed coupler dispersion was added to 500 g. of a high speed silver iodobromide emulsion, which was then coated on a film base, followed by drying, to prepare a light-sensitive material.

On the other hand, a gelatin layer having a thickness of about 5μ was formed on a cellulose triacetate base. Onto the thus formed layer, a tritium-labelled thymidine solution was spotted at the ratio of 10 μ.c. micro/count per square centimeters. Then, spotting was repeated by using double dilution of the said solution. By repeating this method, a standard tritium radiation source having a stepwedge of radioactivity in geometric progression with equal ratio of 2 was prepared. This gelatine layer was brought into close contact with the light-sensitive surface of the above-mentioned light-sensitive material, and allowed to stand for 15 hours. Thereafter, the gelatin layer was removed, and the light-sensitive material was subjected to the same color development as in Example 1 to obtain a magenta colored image which showed the presence of the radioactive substance at portions corresponding to the tritium ray sources.

Example 7

This example illustrates the superior photographic properties exhibited by the photographic materials according to the present invention and those containing prior art couplers whose structure is very close to that of the couplers used in the present invention, except that they are characterized by alkyl groups rather than alkoxy groups in the phenoxy radical. The light sensitive photographic materials were prepared according to the procedure in Example 1, incorporating the following couplers:

Coupler A disclosed in U. S. Pat. No. 2,618,641

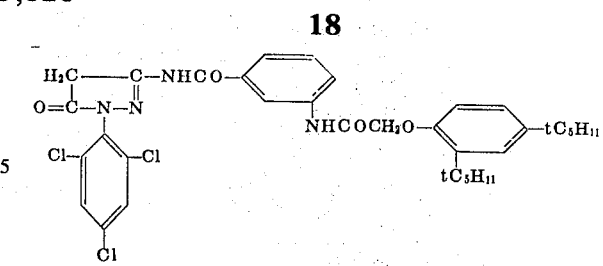

Exemplified coupler (9)

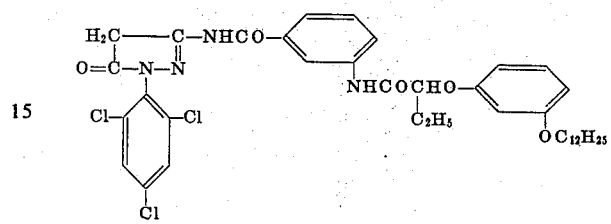

Exemplified coupler (10)

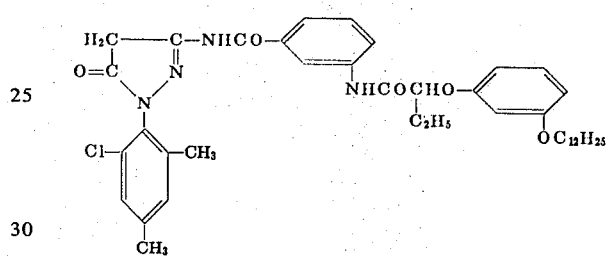

Coupler B disclosed in U. S. Pat. No. 2,801,171

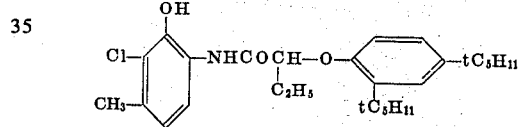

Exemplified coupler (14)

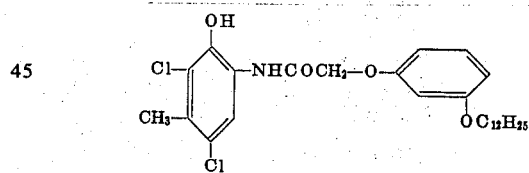

Exemplified coupler (15)

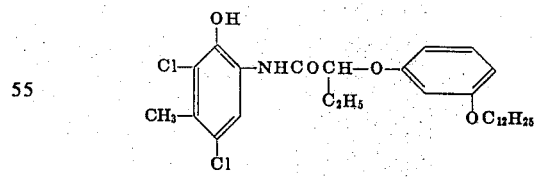

TEST RESULT

|  | Relative speed | Fog | Dmax | Light fastness | Moisture fastness |
| --- | --- | --- | --- | --- | --- |
| Known Coupler A | 100 | 0.08 | 2.30 | 90% | 80% |
| Our Coupler (9) | 110 | 0.08 | 2.45 | 90% | 94% |
| Our Coupler (10) | 114 | 0.06 | 2.45 | 92% | 96% |
| Known Coupler B | 100 | 0.06 | 2.62 | 83% | 98% |
| Our Coupler (14) | 111 | 0.05 | 2.83 | 95% | 98% |
| Our Coupler (15) | 113 | 0.05 | 2.90 | 97% | 99% |

We claim:
1. A light-sensitive silver halide color photographic material characterized by containing a compound represented by the general formula,

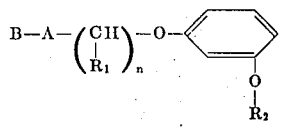

wherein B is a coupler residue of compounds selected from the group consisting of compounds containing a phenolic hydroxy group, pyrazolones and acylacetanilides; $R_1$ is hydrogen or a lower alkyl group; $R_2$ is an aliphatic hydrocarbon group having eight to 18 carbon atoms; $n$ is an integer of one to four; A is an -NHCO- or -CONH- group, provided that in case A is a -CONH- group, $R_1$ is hydrogen and $n$ is three or four, as a coupler in at least one light-sensitive emulsion layer of said photographic material.

2. A light-sensitive silver halide color photographic material as claimed in claim 1, wherein said compound is one member selected from the group consisting of:

α-(2-Methoxybenzoyl)-2-chloro-5-[γ-(3-octyloxyphenoxy) butylamide] acetanilide;
1-(2,4,6-Trichlorophenyl)-3-(α-3-dodecyloxphenoxybutylamide)-5-pyrazolone;
1-(2,4-Dimethyl-6-chlorophenyl)-3-(3-dodecyloxyphenoxy-acetamide)-5-pyrazolone;
1-(2,4,6-Trichlorophenyl)-3-[3-(α-3-dodecylphenoxybutylamide) benzamide]-5-pyrazolone;
1-(2,4,6-Trichlorophenyl)-3-[3-(α-3-dodecyloxyphenoxybutyrylamide) benzamide]-4-(4-methoxyphenylazo)-5-pyrazolone;
2,4-Dichloro-6-(α-3-dodecyloxyphenoxybutylamide)-3-methylphenol;
N-[δ-(3-Dodecyloxy)butyl]-1-hydroxy-2-naphthamide; and
4-(2-Acetylphenylazo)-N-[δ-3-dodecyloxphenoxy) butyl]-1-hydroxy-2-naphthamide.

* * * * *